(12) United States Patent
Saroka et al.

(10) Patent No.: US 11,951,800 B2
(45) Date of Patent: Apr. 9, 2024

(54) SIMULTANEOUS CHARGE/DISCHARGE OF BATTERY FOR TRANSPORTATION REFRIGERATION USAGE

(71) Applicant: Carrier Corporation, Palm Beach Gardens, FL (US)

(72) Inventors: Mary D. Saroka, Syracuse, NY (US); Jeffrey J. Burchhill, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 455 days.

(21) Appl. No.: 17/254,720

(22) PCT Filed: Sep. 23, 2019

(86) PCT No.: PCT/US2019/052389
§ 371 (c)(1),
(2) Date: Dec. 21, 2020

(87) PCT Pub. No.: WO2020/068641
PCT Pub. Date: Apr. 2, 2020

(65) Prior Publication Data
US 2021/0268865 A1 Sep. 2, 2021

Related U.S. Application Data

(60) Provisional application No. 62/737,968, filed on Sep. 28, 2018.

(51) Int. Cl.
*H02J 3/32* (2006.01)
*B60H 1/00* (2006.01)
(Continued)

(52) U.S. Cl.
CPC ..... *B60H 1/00428* (2013.01); *B60H 1/32284* (2019.05); *B60H 1/3232* (2013.01);
(Continued)

(58) Field of Classification Search
CPC .... H02J 1/084; H02J 2310/40; H02J 2310/60; H02J 7/34; H02J 7/35; H02J 3/32;
(Continued)

(56) References Cited

U.S. PATENT DOCUMENTS 3,866,433 A 2/1975 Krug
4,761,577 A 8/1988 Thomas et al.
(Continued)

FOREIGN PATENT DOCUMENTS

CN 207481745 U 6/2018
DE 102014206237 A1 10/2015
(Continued)

OTHER PUBLICATIONS

International Search Report dated Dec. 13, 2019; International Application No. PCT/US2019/052386; International Filing Date Sep. 23, 2019 (4 pgs).

(Continued)

*Primary Examiner* — Binh C Tat
(74) *Attorney, Agent, or Firm* — CANTOR COLBURN LLP (57) ABSTRACT

A transportation refrigeration unit including: at least one component powered by an energy storage device composed of a first energy storage pack and a second energy storage pack, wherein the at least one component draws electrical power from the energy storage device at an operating power; a return air temperature sensor to detect a return air temperature; a controller to adjust the operating power in response to the return air temperature, wherein the controller determines a state of charge of the first energy storage pack and a state of charge of the second energy storage pack, wherein the controller selects at least one of the first energy storage pack and the second energy storage pack to power the at least one component in response to the operating (Continued)

power, the state of charge of the first energy storage pack, and the state of charge of the second energy storage pack.

12 Claims, 4 Drawing Sheets

(51) Int. Cl.
*B60H 1/32* (2006.01)
*B60L 58/13* (2019.01)
*B60L 58/18* (2019.01)
*H02J 7/00* (2006.01)
*H02J 7/14* (2006.01)

(52) U.S. Cl.
CPC ............... *B60L 58/13* (2019.02); *B60L 58/18* (2019.02); *H02J 3/32* (2013.01); *H02J 7/0068* (2013.01); *H02J 7/1415* (2013.01); *B60L 2200/36* (2013.01)

(58) Field of Classification Search
CPC .... H02J 7/0068; H02J 7/1415; H02J 2310/46; H02J 3/008; H02J 7/0063; H02J 2207/20; H02J 2310/12; H02J 3/003; H02J 3/004; H02J 3/14; H02J 7/0048; H02J 7/02; H02J 50/80; H02J 7/00036; H02J 7/0013; H02J 7/0049; H02J 7/04; H02J 7/1438; H02J 7/1492; H02J 7/342; H02J 9/061; H02J 1/06; H02J 1/102; H02J 2310/48; H02J 3/007; H02J 3/144; H02J 4/00; H02J 50/10; H02J 50/12; H02J 50/30; H02J 50/40; H02J 7/007; H02J 7/007182; H02J 7/06; H02J 7/14; H02J 7/32; H02J 7/345; H02J 9/062; B60L 58/26; B60L 50/64; B60L 1/02; B60L 58/12; B60L 2200/36; B60L 1/003; B60L 58/13; F25B 27/00; F25B 2600/021; F25B 27/02; F25B 27/005; F25B 2700/2104; F25B 40/02; F25B 41/22; F25B 21/02; F25B 21/04; F25B 2321/0251; F25B 2321/0252; F25B 2400/13; F25B 2600/00; F25B 2600/2511; F25B 27/002; F25B 2700/15; F25B 2700/21171; F25B 3/00; F25B 40/00; F25B 47/025; F25B 49/02; F25B 49/022; F25B 5/00; F25B 13/00; F25B 2327/001; F25B 25/005; F25B 2600/02; F25B 2600/024; F25B 2600/2509; F25B 2700/197; F25B 2700/2106; F25B 2700/21173; F25B 2700/21175; F25B 39/04; F25B 41/20; F25B 49/025; F25B 9/008; B65D 88/745; B65D 81/3834
USPC .................................................. 320/130–136
See application file for complete search history.

(56) References Cited

U.S. PATENT DOCUMENTS

| | | |
|---|---|---|
| 5,265,435 A | 11/1993 | Richardson |
| 6,725,713 B2 | 4/2004 | Adamson et al. |
| 7,043,932 B2 | 5/2006 | Tofflemire |
| 7,259,469 B2 | 8/2007 | Brummett et al. |
| 7,261,171 B2 | 8/2007 | De La Torre et al. |
| 7,403,103 B2 | 7/2008 | Pearman |
| 7,514,803 B2 | 4/2009 | Wilks |
| 7,547,980 B2 | 6/2009 | Harrison |
| 7,673,466 B2 | 3/2010 | Pacy |
| 7,797,958 B2 | 9/2010 | Alston et al. |
| 8,295,950 B1 | 10/2012 | Wordsworth et al. |
| 8,347,999 B2 | 1/2013 | Koelsch et al. |
| 8,701,430 B2 | 4/2014 | Kitano et al. |
| 8,723,344 B1 | 5/2014 | Dierickx |
| 8,776,541 B2 | 7/2014 | Steele et al. |
| 8,776,928 B2 | 7/2014 | Stover, Jr. et al. |
| 8,825,242 B2 | 9/2014 | Foster |
| 8,905,166 B2 | 12/2014 | Dalum et al. |
| 8,935,933 B1 | 1/2015 | Koelsch |
| 9,389,007 B1 | 7/2016 | McKay |
| 9,415,660 B2 | 8/2016 | Koelsch |
| 9,464,839 B2 | 10/2016 | Rusignuolo et al. |
| 9,586,458 B2 | 3/2017 | Larson et al. |
| 9,707,844 B2 | 7/2017 | Arnold et al. |
| 9,758,013 B2 | 9/2017 | Steele |
| 9,975,403 B2 | 5/2018 | Rusignuolo et al. |
| 10,046,641 B2 | 8/2018 | Penmetsa et al. |
| 2006/0030450 A1 | 2/2006 | Kyle |
| 2010/0045105 A1 | 2/2010 | Bovio et al. |
| 2011/0031051 A1 | 2/2011 | George |
| 2012/0227926 A1* | 9/2012 | Field ................. F24S 10/95 165/157 |
| 2016/0320107 A1* | 11/2016 | McKay ............... H02K 7/1846 |
| 2016/0334154 A1* | 11/2016 | Srichai ................ F28D 20/02 |
| 2017/0292759 A1 | 10/2017 | Al-Hallaj et al. |
| 2017/0349078 A1 | 12/2017 | Dziuba et al. |
| 2018/0001739 A1 | 1/2018 | Vehr et al. |
| 2018/0069428 A1 | 3/2018 | Hsieh et al. |
| 2018/0094846 A1 | 4/2018 | Koelsch |
| 2018/0245825 A1 | 8/2018 | Koelsch |
| 2018/0264951 A1 | 9/2018 | Kooi |

FOREIGN PATENT DOCUMENTS

| | | |
|---|---|---|
| EP | 2128545 A1 | 10/2013 |
| EP | 2436543 B1 | 9/2018 |
| FR | 2691022 A1 | 11/1993 |
| GB | 2506468 A | 4/2014 |
| WO | 2017215966 A1 | 12/2017 |

OTHER PUBLICATIONS

Refrigerated Transporter. Wedway reefer power system generates zero emissions. Apr. 25, 2013. Retrieved from https://www.refrigeratedtransporter.com/emissions/wedway-reefer-power-system-generates-zero-emissions. 3 Pages.
Written Opinion dated Dec. 13, 2019; International Application No. PCT/US2019/052386; International Filing Date Sep. 23, 2019 (8 pgs).
European Search Report for Application No. 1979896.5; dated Mar. 28, 2023; 8 Pages.

* cited by examiner

SIMULTANEOUS CHARGE/DISCHARGE OF BATTERY FOR TRANSPORTATION REFRIGERATION USAGE

BACKGROUND

The subject matter disclosed herein generally relates to transportation refrigeration units, and more specifically to an apparatus and a method for controlling environmental conditions for a power source of a transportation refrigeration unit.

Traditional refrigerated cargo trucks or refrigerated tractor trailers, such as those utilized to transport cargo via sea, rail, or road, is a truck, trailer or cargo container, generally defining a cargo compartment, and modified to include a refrigeration system located at one end of the truck, trailer, or cargo container. Refrigeration systems typically include a compressor, a condenser, an expansion valve, and an evaporator serially connected by refrigerant lines in a closed refrigerant circuit in accord with known refrigerant vapor compression cycles. A power unit, such as a combustion engine, drives the compressor of the refrigeration unit, and may be diesel powered, natural gas powered, or other type of engine. In many tractor trailer transport refrigeration systems, the compressor is driven by the engine shaft either through a belt drive or by a mechanical shaft-to-shaft link. In other systems, the engine of the refrigeration unit drives a generator that generates electrical power, which in-turn drives the compressor.

With current environmental trends, improvements in transportation refrigeration units are desirable particularly toward aspects of efficiency, sound and environmental impact. With environmentally friendly refrigeration units, improvements in reliability, cost, and weight reduction is also desirable.

BRIEF SUMMARY

According to one embodiment, a transportation refrigeration unit is provided. The transportation refrigeration unit including: at least one component of the transportation refrigeration unit powered by an energy storage device composed of a first energy storage pack and a second energy storage pack, wherein the at least one component of the transportation refrigeration unit draws electrical power from the energy storage device at an operating power; a return air temperature sensor to detect return air temperature of return air returning to the transportation refrigeration unit; a controller to adjust the operating power in response to the return air temperature, wherein the controller determines a state of charge of the first energy storage pack and a state of charge of the second energy storage pack, wherein the controller selects at least one of the first energy storage pack and the second energy storage pack to power the at least one component of the transportation refrigeration unit in response to the operating power, the state of charge of the first energy storage pack, and the state of charge of the second energy storage pack.

In addition to one or more of the features described above, or as an alternative, further embodiments may include that at least one of the first energy storage pack and the second energy storage pack includes a battery system.

In addition to one or more of the features described above, or as an alternative, further embodiments may include that the controller selects the first energy storage pack to be charged by an electrical power source when the first energy storage pack is not powering the at least one component of the transportation refrigeration unit.

In addition to one or more of the features described above, or as an alternative, further embodiments may include that the controller selects the second energy storage pack to be charged by an electrical power source when the second energy storage pack is not powering the at least one component of the transportation refrigeration unit.

In addition to one or more of the features described above, or as an alternative, further embodiments may include that the electrical power source is at least one of an axle generator and a hub generator.

In addition to one or more of the features described above, or as an alternative, further embodiments may include that the electrical power source is at least one of an axle generator and a hub generator.

In addition to one or more of the features described above, or as an alternative, further embodiments may include that the energy storage device are located outside of the transportation refrigeration unit.

In addition to one or more of the features described above, or as an alternative, further embodiments may include that the energy storage device are located within the transportation refrigeration unit.

In addition to one or more of the features described above, or as an alternative, further embodiments may include the energy storage device.

In addition to one or more of the features described above, or as an alternative, further embodiments may include that the controller is electrically connected to the energy storage device through a switching device that switches power draw from the at least one component of the transportation refrigeration unit between the first energy storage pack and the second energy storage pack.

According to another embodiment, a method of operating a transportation refrigeration unit is provided. The method including: powering at least one component of the transportation refrigeration unit using an energy storage device composed of a first energy storage pack and a second energy storage pack, wherein the at least one component of the transportation refrigeration unit draws electrical power from the energy storage device at an operating power; detecting a return air temperature of air returning to the transportation refrigeration unit using a return air temperature sensor; determining a state of charge of the first energy storage pack and a state of charge of the second energy storage pack; and selecting at least one of the first energy storage pack and the second energy storage pack to power the at least one component of the transportation refrigeration unit in response to an operating power, a state of charge of the first energy storage pack, and a state of charge of the second energy storage pack.

In addition to one or more of the features described above, or as an alternative, further embodiments may include that at least one of the first energy storage pack and the second energy storage pack includes a battery system.

In addition to one or more of the features described above, or as an alternative, further embodiments may include: selecting the first energy storage pack to be charged by an electrical power source when the first energy storage pack is not powering the at least one component of the transportation refrigeration unit.

In addition to one or more of the features described above, or as an alternative, further embodiments may include: selecting the second energy storage pack to be charged by an electrical power source when the second energy storage pack is not powering the at least one component of the transportation refrigeration unit.

In addition to one or more of the features described above, or as an alternative, further embodiments may include that the electrical power source is at least one of an axle generator and a hub generator.

In addition to one or more of the features described above, or as an alternative, further embodiments may include that the electrical power source is at least one of an axle generator and a hub generator.

In addition to one or more of the features described above, or as an alternative, further embodiments may include that the energy storage device are located outside of the transportation refrigeration unit.

In addition to one or more of the features described above, or as an alternative, further embodiments may include that the energy storage device are located within the transportation refrigeration unit.

In addition to one or more of the features described above, or as an alternative, further embodiments may include that the transportation refrigeration unit further includes the energy storage device.

In addition to one or more of the features described above, or as an alternative, further embodiments may include that the controller is electrically connected to the energy storage device through a switching device that switches power draw from the at least one component of the transportation refrigeration unit between the first energy storage pack and the second energy storage pack.

Technical effects of embodiments of the present disclosure include a transportation refrigeration unit coupled to and powered by an energy storage device having two energy storage packs that alternate between charging and powering the transportation refrigeration unit.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
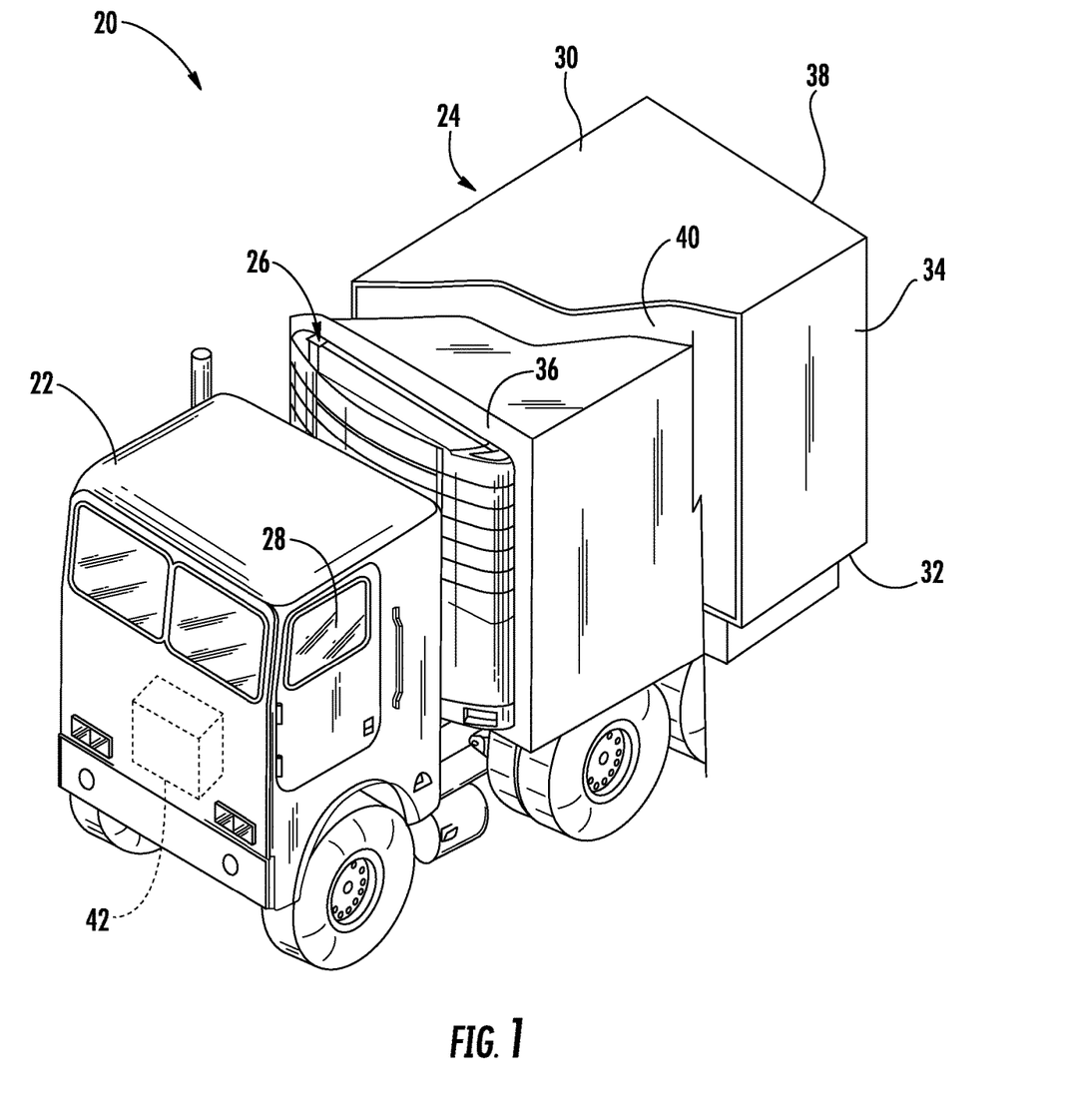
FIG. 1 is a perspective view of a transportation refrigeration system having an engineless transportation refrigeration unit as one, non-limiting, according to an embodiment of the present disclosure.

Referring to FIG. 1, a transport refrigeration system 20 of the present disclosure is illustrated. In the illustrated embodiment, the transport refrigeration systems 20 may include a tractor or vehicle 22, a container 24, and an engineless transportation refrigeration unit (TRU) 26. The container 24 may be pulled by a vehicle 22. It is understood that embodiments described herein may be applied to shipping containers that are shipped by rail, sea, air, or any other suitable container, thus the vehicle may be a truck, train, boat, airplane, helicopter, etc.

The vehicle 22 may include an operator's compartment or cab 28 and an engine 42 which is part of the powertrain or drive system of the vehicle 22. The engine 42 may be a propulsion engines including but not limited to an electric motor, a combustion engine, or a combination thereof. The container 24 may be coupled to the vehicle 22 and is thus pulled or propelled to desired destinations. The trailer may include a top wall 30, a bottom wall 32 opposed to and spaced from the top wall 30, two side walls 34 spaced from and opposed to one-another, and opposing front and rear walls 36, 38 with the front wall 36 being closest to the vehicle 22. The container 24 may further include doors (not shown) at the rear wall 38, or any other wall. The walls 30, 32, 34, 36, 38 together define the boundaries of a cargo compartment 40. Typically, transport refrigeration systems 20 are used to transport and distribute cargo, such as, for example perishable goods and environmentally sensitive goods (herein referred to as perishable goods). The perishable goods may include but are not limited to fruits, vegetables, grains, beans, nuts, eggs, dairy, seed, flowers, meat, poultry, fish, ice, blood, pharmaceuticals, or any other suitable cargo requiring cold chain transport. In the illustrated embodiment, the TRU 26 is associated with a container 24 to provide desired environmental parameters, such as, for example temperature, pressure, humidity, carbon dioxide, ethylene, ozone, light exposure, vibration exposure, and other conditions to the cargo compartment 40. In further embodiments, the TRU 26 is a refrigeration system capable of providing a desired temperature and humidity range.

Figure 2:
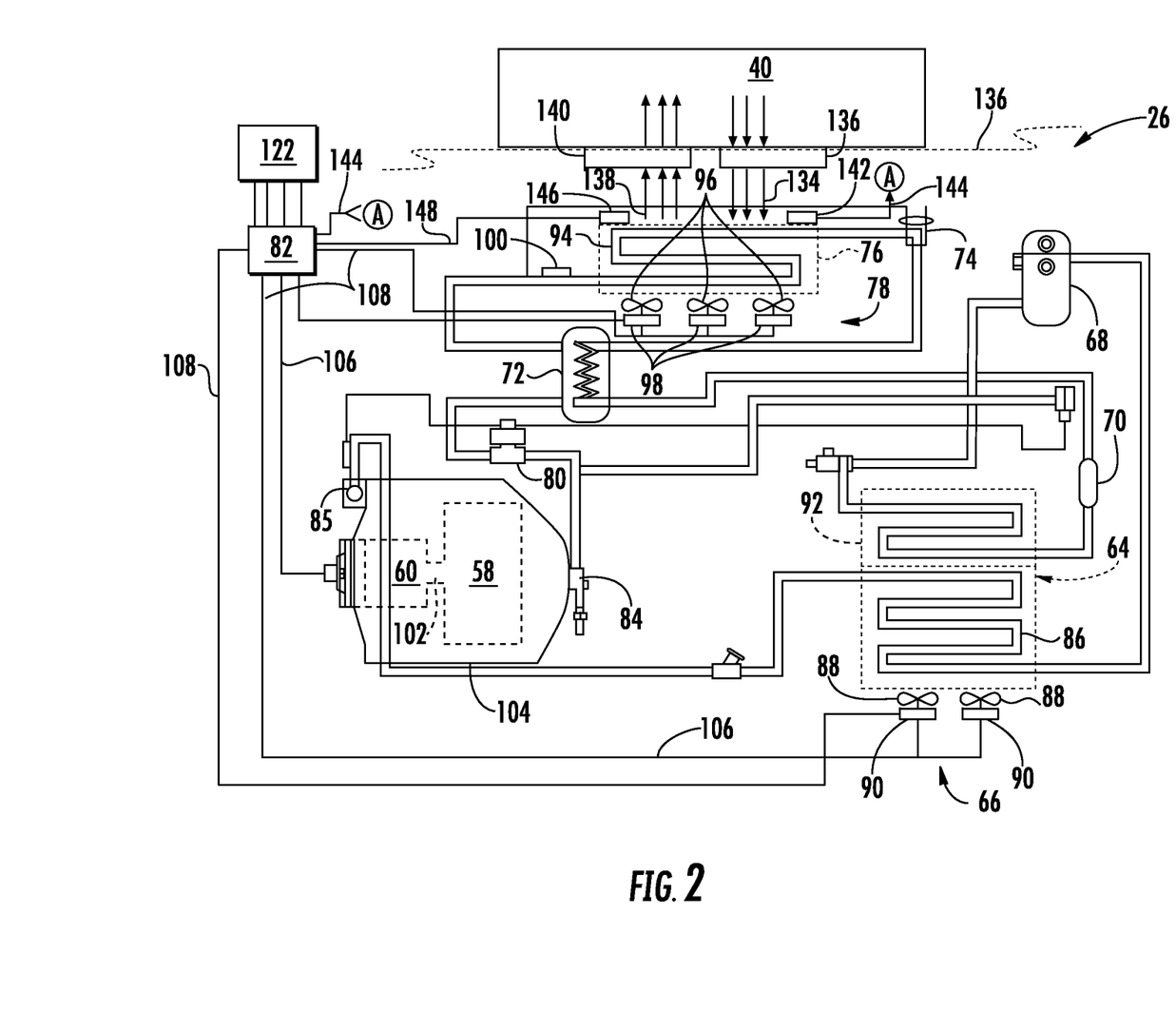
FIG. 2 is a schematic of the engineless transportation refrigeration unit, according to an embodiment of the present disclosure.

Referring to FIGS. 1 and 2, the container 24 is generally constructed to store a cargo (not shown) in the compartment 40. The engineless TRU 26 is generally integrated into the container 24 and may be mounted to the front wall 36. The cargo is maintained at a desired temperature by cooling of the compartment 40 via the TRU 26 that circulates refrigerated airflow into and through the cargo compartment 40 of the container 24. It is further contemplated and understood that the TRU 26 may be applied to any transport compartments (e.g., shipping or transport containers) and not necessarily those used in tractor trailer systems. Furthermore, the transport container may be a part of the of the vehicle 22 or constructed to be removed from a framework and wheels (not shown) of the container 24 for alternative shipping means (e.g., marine, railroad, flight, and others).

The components of the engineless TRU 26 may include a compressor 58, an electric compressor motor 60, an electric energy storage device 152, a condenser 64 that may be air cooled, a condenser fan assembly 66, a receiver 68, a filter dryer 70, a heat exchanger 72, an expansion valve 74, an evaporator 76, an evaporator fan assembly 78, a suction modulation valve 80, and a controller 82 that may include a computer-based processor (e.g., microprocessor) and the like as will be described further herein. Operation of the engineless TRU 26 may best be understood by starting at the compressor 58, where the suction gas (e.g., natural refrigerant, hydro-fluorocarbon (HFC) R-404a, HFC R-134a . . . etc) enters the compressor 58 at a suction port 84 and is compressed to a higher temperature and pressure. The refrigerant gas is emitted from the compressor 58 at an outlet port 85 and may then flow into tube(s) 86 of the condenser 64.

Air flowing across a plurality of condenser coil fins (not shown) and the tubes 86, cools the gas to its saturation temperature. The airflow across the condenser 64 may be facilitated by one or more fans 88 of the condenser fan assembly 66. The condenser fans 88 may be driven by respective condenser fan motors 90 of the fan assembly 66 that may be electric. By removing latent heat, the refrigerant gas within the tubes 86 condenses to a high pressure and high temperature liquid and flows to the receiver 68 that provides storage for excess liquid refrigerant during low temperature operation. From the receiver 68, the liquid refrigerant may pass through a sub-cooler heat exchanger 92 of the condenser 64, through the filter-dryer 70 that keeps the refrigerant clean and dry, then to the heat exchanger 72 that increases the refrigerant sub-cooling, and finally to the expansion valve 74.

As the liquid refrigerant passes through the orifices of the expansion valve 74, some of the liquid vaporizes into a gas (i.e., flash gas). Return air from the refrigerated space (i.e., cargo compartment 40) flows over the heat transfer surface of the evaporator 76. As the refrigerant flows through a plurality of tubes 94 of the evaporator 76, the remaining liquid refrigerant absorbs heat from the return air, and in so doing, is vaporized and thereby cools the return air.

The evaporator fan assembly 78 includes one or more evaporator fans 96 that may be driven by respective fan motors 98 that may be electric. The airflow across the evaporator 76 is facilitated by the evaporator fans 96. From the evaporator 76, the refrigerant, in vapor form, may then flow through the suction modulation valve 80, and back to the compressor 58. The expansion valve 74 may be thermostatic or electrically adjustable. In an embodiment, as depicted, the expansion valve 74 is thermostatic. A thermostatic expansion valve bulb sensor 100 may be located proximate to an outlet of the evaporator tube 94. The bulb sensor 100 is intended to control the thermostatic expansion valve 74, thereby controlling refrigerant superheat at an outlet of the evaporator tube 94. The thermostatic expansion valve 74 may be an electronic expansion valve is in communication with the TRU controller 82. The controller 82 may position the valve in response to temperature and pressure measurements at the exit of the evaporator 76. It is further contemplated and understood that the above generally describes a single stage vapor compression system that may be used for HFCs such as R-404a and R-134a and natural refrigerants such as propane and ammonia. Other refrigerant systems may also be applied that use carbon dioxide ($CO_2$) refrigerant, and that may be a two-stage vapor compression system.

A bypass valve (not shown) may facilitate the flash gas of the refrigerant to bypass the evaporator 76. This will allow the evaporator coil to be filled with liquid and completely 'wetted' to improve heat transfer efficiency. With $CO_2$ refrigerant, this bypass flash gas may be re-introduced into a mid-stage of a two-stage compressor 58.

The compressor 58 and the compressor motor 60 may be linked via an interconnecting drive shaft 102. The compressor 58, the compressor motor 60 and the drive shaft 102 may all be sealed within a common housing 104. The compressor 58 may be a single compressor. The single compressor may be a two-stage compressor, a scroll-type compressor or other compressors adapted to compress HFCs or natural refrigerants. The natural refrigerant may be $CO_2$, propane, ammonia, or any other natural refrigerant that may include a global-warming potential (GWP) of about one (1).

Continuing with FIG. 2, with continued reference to FIG. 1. FIG. 2 also illustrates airflow through the TRU 26 and the cargo compartment 40. Airflow is circulated into and through and out of the cargo compartment 40 of the container 24 by means of the TRU 26. A return airflow 134 flows into the TRU 26 from the cargo compartment 40 through a return air intake 136, and across the evaporator 76 via the fan 96, thus conditioning the return airflow 134 to a selected or predetermined temperature. The conditioned return airflow 134, now referred to as supply airflow 138, is supplied into the cargo compartment 40 of the container 24 through the refrigeration unit outlet 140, which in some embodiments is located near the top wall 30 of the container 24. The supply airflow 138 cools the perishable goods in the cargo compartment 40 of the container 24. It is to be appreciated that the TRU 26 can further be operated in reverse to warm the container 24 when, for example, the outside temperature is very low.

A return air temperature sensor 142 (i.e., thermistor, thermocouples, RTD, and the like) is placed in the air stream, on the evaporator 76, at the return air intake 136, and the like, to monitor the temperature return airflow 134 from the cargo compartment 40. A sensor signal indicative of the return airflow temperature denoted RAT is operably connected via line 144 to the TRU controller 82 to facilitate control and operation of the TRU 26. Likewise, a supply air temperature sensor 146 is placed in the supply airflow 138, on the evaporator 76, at the refrigeration unit outlet 140 to monitor the temperature of the supply airflow 138 directed into the cargo compartment 40. Likewise, a sensor signal indicative of the supply airflow temperature denoted SAT 14 is operably connected via line 148 to the TRU controller 82 to facilitate control and operation of the TRU 26.

Figure 3:
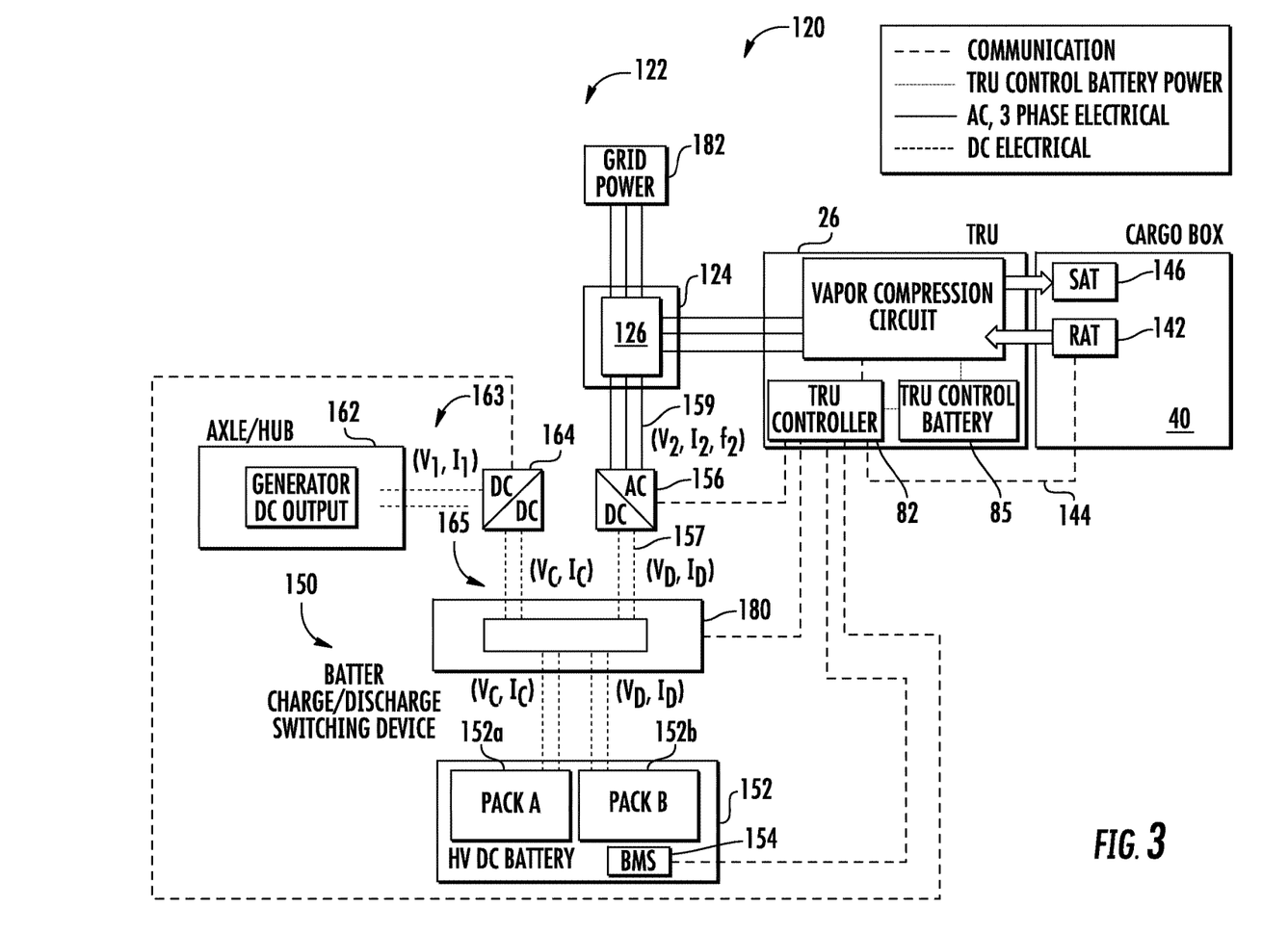
FIG. 3 is a block diagram of a power supply interface of the transportation refrigeration unit, according to an embodiment of the present disclosure.

Referring now to FIGS. 2 and 3, with continued reference to FIG. 1 as well, the TRU 26 may include or be operably interfaced with a power supply interface shown generally as 120. The power supply interface 120 may include, interfaces to various power sources denoted generally as 122 and more specifically as follows herein for the TRU 26 and the components thereof. In an embodiment the power sources 122 may include, but not be limited to an energy storage device 152, generator 162, and grid power, 182. Each of the power sources 122 may be configured to selectively power at least one component of the TRU 26 including compressor motor 60, the condenser fan motors 90, the evaporator fan motors 98, the controller 82, and other components 99 of the TRU 26 that may include various solenoids and/or sensors). The controller 82 through a series of data and command signals over various pathways 108 may, for example, control the application of power to the electric motors 60, 90, 98 as dictated by the cooling needs of the TRU 26.

The engineless TRU 26 may include an AC or DC architecture with selected components employing alternating current (AC), and others employing direct current (DC). For example, in an embodiment, the motors 60, 90, 98 may be configured as AC motors, while in other embodiments, the motors 60, 90, 98 may be configured as DC motors. The operation of the of the power sources 122 as they supply power to the TRU 26 may be managed and monitored by power management system 124. The power management system 124 is configured to determine a status of various power sources 122, control their operation, and direct the power to and from the various power sources 122 and the like based on various requirements of the TRU 26. In an embodiment, the TRU controller 82 receives various signals indicative of the operational state of the TRU 26 and determines the power requirements for the TRU system 26 accordingly and directs the power supply interface 120 and specifically the power management system 124 to direct power accordingly to address the requirements of the TRU 26. In one embodiment, the TRU controller monitors the RAT and optionally the SAT as measured by the return air temperature sensors 142 and supply air temperature sensor 146 respectively. The TRU controller 82 estimates the power requirements for the TRU 26 based on the RAT (among others) and provides commands accordingly to the various components of the power supply interface 120 and specifically the power management system 124, energy storage system 150, and generator power converter 164 to manage the generation, conversion, and routing of power in the power supply interface 120 and TRU system 26.

The TRU 26 is controlled to a temperature setpoint instruction provided by a user of the TRU 26. The TRU controller 82 may determine an estimate power demand in response to the measured RAT and the setpoint value. For example, if the (RAT-Setpoint) is above a first threshold (i.e. >10 deg F.), full power of the TRU 26 is needed (i.e. at Voltage, max. amps is known). If the (RAT-Setpoint) is between first threshold and second threshold, current is limited (at voltage) to achieve a middle power (i.e., 50% power). If the (RAT-Setpoint) is below second threshold, current is limited (at voltage) to achieve a minimum power (i.e. 20% power).

With respect to switching power, the TRU controller 82 knows if the TRU 26 is on and what power is needed for operation of the TRU 26. The TRU controller 82 may also be programmed to know whether or not grid power 182 is available or not. If the grid power 182 is available, the TRU 26 is On, and the state of charge of the energy storage device 152 indicates energy storage device 152 is fully charged, grid power 182 will satisfy TRU 26 power demand. If grid power 182 is available, the TRU 26 is On, and the energy storage device 152 is not fully charged, the power demand of the TRU 26 is satisfied as a first priority and then DC/AC inverter 156 will be activated to provide necessary charging amps to energy storage device 152 as a second priority. If grid power 182 is available, the TRU 26 is Off, and the energy storage device 152 is not fully charged, then the DC/AC inverter 156 will be activated to provide necessary charging amps to energy storage device 152. If grid power 182 is not available, all of the power demand for the TRU 26 is satisfied by the energy storage device 152.

The TRU controller 82 is configured to control the components in the TRU 26 as well as the components of the power supply interface 120 in accordance with operating needs of the transport refrigeration system 20. The TRU controller 82 is communicatively coupled to the DC/AC converter 156, battery management system 154, DC/DC converter 164, and a switching device 180, such that operation of the converters 164, 156 and the energy storage device 152 meet the power demand of the TRU 26 by discharging one of the energy storage pack 152a and charging the other energy storage pack 152b from the generator 162 when the when the transport refrigeration system 20 is in motion.

The switching device 180 receives power from a generator 162 directly and/or via a generator power converter 164. In an embodiment, the power management system 124 may be a stand-alone unit, integral with the generator power converter 164, and/or integral with the TRU 26. The generator 162 can be at least one of an axle generator and a hub generator mounted configured to recover rotational energy when the transport refrigeration system 20 is in motion and convert that rotational energy to electrical energy, such as, for example, when the axle of the vehicle 22 is rotating due to acceleration, cruising, or braking. The axle generator may be mounted on a wheel axle of the vehicle 22 and the hub generator may be mounted on a wheel of the vehicle 22. In an embodiment the generator 162 may be DC, providing a first DC power 163 including a DC voltage and DC current denoted as $V_1$, and DC current $I_1$. The generator power converter 164 in one or more embodiments generates a second DC power 165 including a DC voltage $V_C$, a second DC current $I_C$. The second DC power 165 may be transmitted into the energy storage device 152 to charge at least one of the first energy storage pack 152a and a second energy storage pack 152b, discussed further below. In it is understood in another embodiment that the generator 162 may produce AC power, thereby providing an AC voltage, AC current and frequency denoted as $V_1'$, $I_1'$, $f_1'$. This AC power is converted to DC by an AC/DC converter (e.g., the AC/DC converter replacing the DC/DC converter 164 of FIG. 3) for transmission to into the energy storage device 152 via the switching device 180.

Continuing with FIG. 3 and the architecture of the power supply interface 120 and the various power sources 122 employed to power the TRU 26 and the components thereof. In an embodiment one of the power sources 122 may include, but not be limited to an energy storage system 150 operably coupled to the power management system 124. As described herein, another power source 122 that the power management system 124 receives or sends power from is the switching device 180, whether discharging or charging the energy storage system 150. For example, the switch device 180 receives power from the energy storage system 150 when operating the TRU 26 and sends power to the energy storage system 150 (i.e., charging) when grid power 182 is connected and TRU 26 is turned Off, or as 2nd power priority if TRU 26 is turned On. Furthermore, the grid power source 182 provides three phase AC power to the power management system 124 under selected conditions. The energy storage system 150 transmits DC power 157 to and receives power from the power management system 124. The energy storage system 150 may include, but not be limited to the energy storage device 152, and DC/AC converter 156 and a battery management system 154. In one embodiment, the power management system 124 provides three phase AC power 159 to a DC/AC converter 156 to formulate a DC voltage and current to charge and store energy on the energy storage device 152. Conversely, in other embodiments the energy storage device 152 supplies DC voltage and current 157 to the DC/AC converter 156 operating as a DC/AC converter to supply AC power 159 for powering the TRU 26. The TRU may also include a dedicated TRU control battery 85 to power the TRU controller 82. For example, the TRU control battery 85 may include a 12V or 24V lead-acid (DC) battery to provide power to the TRU Controller 82. Power from the TRU control battery 85 is also used to support sensors and valve operations as needed.

The battery management system 154 monitors the performance of the energy storage device 152. For example, monitoring the state of charge of the energy storage device 152, a state of health of the energy storage device 152, and a temperature of the energy storage device 152. Examples of the energy storage device 152 may include a battery system (e.g., a battery or bank of batteries), fuel cells, flow battery, and others devices capable of storing and outputting electric energy that may be DC. The energy storage device 152 may include a battery system, which may employ multiple batteries organized into battery banks through which cooling air may flow for battery temperature control, as described in U.S. patent application Ser. No. 62/616,077, filed Jan. 11, 2018, the contents of which are incorporated herein in their entirety. In an embodiment, the energy storage device 152 may include a first energy storage pack 152a and a second energy storage pack 152b.

The BMS 154 is configured to detect a state of charge of the first energy storage pack 152a and a state of charge of the second energy storage pack 152b and transmit the state of charge of the first energy storage pack 152a and state of charge of the second energy storage pack 154 to the TRU controller 82. Based upon the return air temperature detected by the return air temperature sensor 142, the TRU controller 82 is configured to determine an operating power 144a required by the TRU 26. The operating power may include an operating voltage $V_2$, an operating current $I_2$ and an operating frequency $f_2$. The TRU controller 82 is configured to adjust the operating power of the TRU 26 in response to the return air temperature detected by the return air temperature sensor 142. The TRU controller 82 is also configured to determine a state of charge of the first energy storage pack 152a and a state of charge of the second energy storage pack 152b, which may be accomplished by contacting the BMS 154. The TRU controller 82 selects at least one of the first energy storage pack 152a and the second energy storage pack 152b to power the at least one component of the TRU 26 in response to an operating power 144a, a state of charge of the first energy storage pack 152a, and a state of charge of the second energy storage pack 152b. At least one of the first energy storage pack 152a and the second energy storage pack 152b may also be used to power the at least one component of the TRU 26 including but not limited to, the compressor motor 60, condenser fan motors 90, evaporator fan motors 92, defrost heaters (if present in some TRU configurations), and/or any other component in the vapor compression circuit of the TRU 26 needing AC power to operate. In an embodiment, only one of the first energy storage pack 152a and the second energy storage pack 152b may power the component of the TRU 26 at a single time.

The TRU controller 82 may be in electronic communication with a switching device 180 that actively switches power draw from the component of the TRU 26 between the first energy storage pack 152a and the second energy storage pack 152b. For instance, if one of the energy storage pack 152a, 152b gets below a selected state of charge (e.g., 20%) then the TRU controller 82 commands that the switching device 180 pull operating power for the TRU 26 from the energy storage pack 152a, 152b that is at a state of charge above the selected state of charge (e.g., 20%). The TRU controller 82 may be configured to utilize the switching device 180 to switch between the energy storage pack 152a, 152b so the neither of the energy storage pack 152a, 152b drop below the selected state of charge. The TRU controller 82 may be configured to utilize the switching device 180 to switch between the energy storage pack 152a, 152b so the neither of the energy storage pack 152a, 152b charge past a second selected state of charge. For example, each energy storage pack 152a, 152b may only be charged to 90% to extend the usable life of each energy storage pack 152a, 152b.

The generator power converter 164 may be in electronic communication with the TRU controller 82, such that the TRU controller 82 may control and/or adjust charge rates of the energy storage packs 152a, 152b. The 156 may be in electronic communication with the TRU controller 82, such that the TRU controller 82 may control and/or adjust discharge of the energy storage packs 152a, 152b to satisfy the operating power of the TRU 26. The AC/DC converter 156 handles the discharging and the charging of energy storage packs 152a, 152b when the power source 182 is connected and the TRU 26 is off.

The energy storage pack 152a, 152b that is not providing operating power to the TRU 26 may be then charged by the generator 162. In an embodiment, the TRU controller 82 selects the first energy storage pack 152a to be charged by an electrical power source (e.g., the generator 162) when the first energy storage pack 152a is not powering the at least one component of the TRU 26. In another embodiment, the compressor controller 82 selects the second energy storage pack 152b to be charged by an electrical power source (e.g., the generator 162) when the second energy storage pack 152b is not powering the at least one component of the TRU 26. In another embodiment, energy storage pack 152a, 152b that is providing operating power to the TRU 26 may not be charged by the generator 162 at the same time.

In an embodiment, the switching device 180 may be located proximate the energy storage device 150. In one embodiment, the energy storage device 152 are located outside of the TRU 26, as shown in FIG. 3. In another embodiment, the energy storage device 152 are located within the TRU 26. The TRU 26 may comprise the energy storage device 152 and the temperature control system 153.

At least one of the first energy storage pack 152a and the second energy storage pack 152b may include a battery system. If the first energy storage pack 152a and/or the second energy storage pack 152b includes at a battery system for the energy storage device 152, the battery system may have a voltage potential within a range of about two-hundred volts (200V) to about six-hundred volts (600V). Generally, the higher the voltage, the greater is the sustainability of electric power which is preferred. However, the higher the voltage, the greater is the size and weight of, for example, batteries in an energy storage device 152, which is not preferred when transporting cargo. Additionally, if the energy storage device 152 is a battery, then in order to increase either voltage and/or current, the batteries need to be connected in series or parallel depending upon electrical needs. Higher voltages in a battery energy storage device 152 will require more batteries in series than lower voltages, which in turn results in bigger and heavier battery energy storage device 152). A lower voltage and higher current system may be used, however such a system may require larger cabling or bus bars. In one embodiment, the energy storage device 152 may be contained within the structure 27 of the TRU 26. In an embodiment, the energy storage device 152 is located with the TRU 26, however other configurations are possible. In another embodiment, the energy storage device may be located with the container 24 such as, for example, underneath the cargo compartment 40. Likewise, the DC/AC converter 156 may be located with the container 24 such as, for example, underneath the cargo compartment 40, however, in some embodiments it may be desirable to have the DC/AC converter 156 in close proximity to the power management system 124 and/or the TRU 26 and TRU controller 82. It will be appreciated that in one or more embodiments, while particular locations are described with respect to connection and placement of selected components including the energy storage device 152 and/or DC/AC converter 156, such descriptions are merely illustrative and are not intended to be limiting. Varied location, arrangement and configuration of components is possible and within the scope of the disclosure.

The battery management system 154 and DC/AC converter 156 are operably connected to and interface with the TRU controller 82. The TRU controller 82 receives information regarding the status of energy storage system 150, including the energy storage device 152 to provide control inputs to the DC/AC converter 156 to monitor the energy storage device, 152, control charge and discharge rates for the energy storage device 152 and the like.

Continuing with FIG. 3, as described earlier, the power supply interface 120 may include, interfaces to various power sources 122 managed and monitored by power management system 124. The power management system 124 manages and determines electrical power flows in the power supply interface 120 based upon the operational needs of the TRU 26 and the capabilities of the components in the power supply interface 120, (e.g., generator 162, converter 164, energy storage device 152, and the like. The power management system 124 is configured to determine a status of various power sources 122, control their operation, and direct the power to and from the various power sources 122 and the like based on various requirements of the TRU 26.

In an embodiment there are four primary power flows managed by the power management system 124. First, the power supplied to the power management system 124 when the TRU system 26 is operably connected to grid power source 182. Second, the power supplied to the power management system 124 from an energy storage device 152. Third, the power directed from the power management system 124 to the energy storage device 152. Fourth, the power directed to the TRU 26 from the power management system 124 for providing power to operate the TRU 26.

The four power flows will be transferred through different paths based on the requirements placed on the power management system 124 and particular configuration of the power supply interface 120. The power management system 124 operates as a central power bus to connect various power sources 122 together to supply the power needs of the TRU 26. The power management system 124 controls switching, directing, or redirecting power to/from the five power flows as needed to satisfy the power requirements of the TRU 26. Switching, directing, and redirecting may readily be accomplished employing a bus control switching device 126 of the power management system 124. The bus control switching device 126 may include, but not be limited to, electromechanical and solid state semiconductor switching devices including relays, contactors, solid state contactors as well as semiconductor switching devices such as transistors, FETs, MOSFETS, IGBT's, thyristors, SCR's, and the like. In addition, to facilitate and implement the functionality of the power management system 124, the voltages and frequencies of the power whether supplied by the grid power supply 182 or the DC/AC converter 156 of the switching device 180 power from/to the energy storage device 152 need to be synchronized to provide a common power source to be supplied to the TRU 26 and/or charge the energy storage device 152. Current draw will be determined by the TRU 26 and the need to charge the energy storage device 152.

The grid power from the grid power source 182 and/or power directed to/from the energy storage system 150 is supplied to the bus control switching device 126 in an overlapping or break-before-make condition as determined by the bus control switching device 126. The DC/AC converter 156, when operating as a DC to AC converter synchronizes the voltage and frequency of the power generated (e.g., 157) with the bus control switching device 126 in order to transfer power from the energy storage device 152 to the power management system 124 (an thereby the TRU 26) as needed. Likewise, grid power from the grid power source 182 provided to the power management system 124 is directed by the bus control switching device 126 once connected and before grid power transfer is made. The DC/AC converter 156 will monitor the bus voltage/frequency of bus control switching device 126 to determine if the above parameters equal before connectivity, thus allowing minimum disruption of the power bus system. The power bus control device 126 communicates to the TRU controller 82 to determine status of flows connected. In an embodiment, the power management system 124, and or the TRU controller 82 provides visual indications of which source is selected and operating on the bus control switching device 126.

Figure 4:
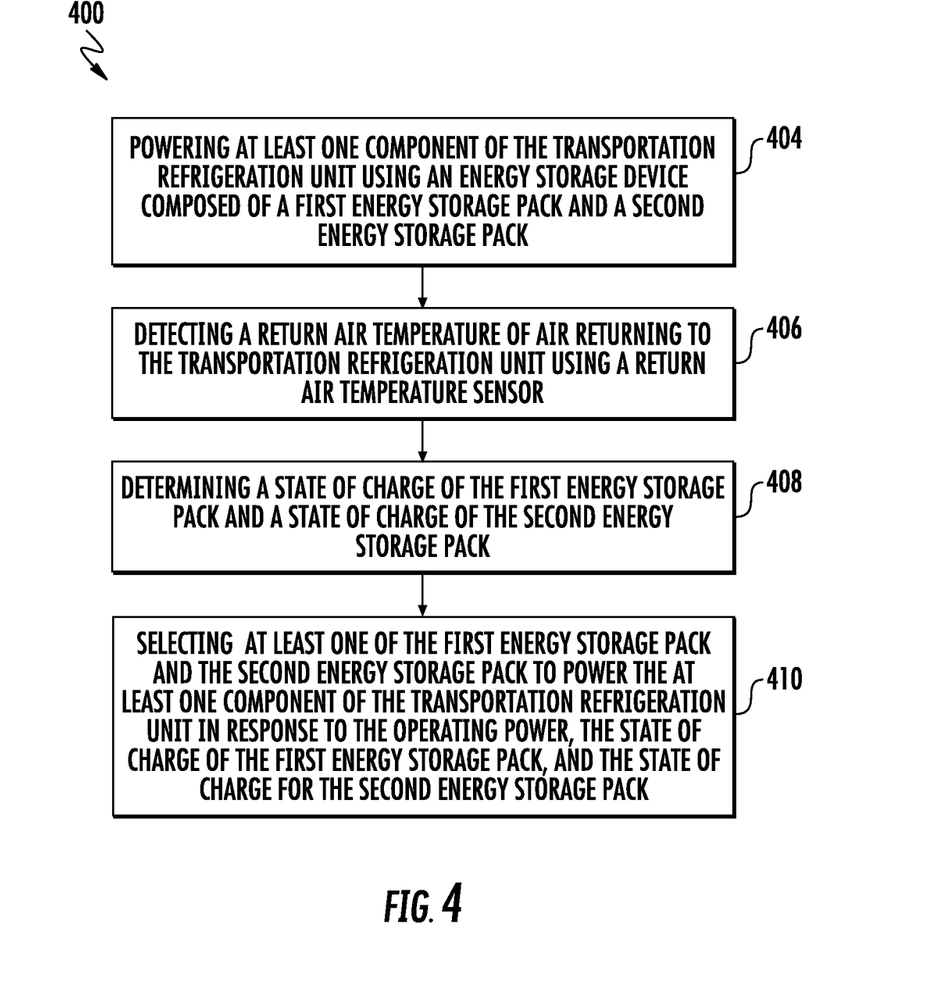
FIG. 4 is a flow diagram illustrating a method of operating a transportation refrigeration unit, according to an embodiment of the present disclosure.

Referring now to FIG. 4, while referencing components of FIGS. 1-3. FIG. 4 shows a flow chart of method 400 of operating a TRU 26. In an embodiment, the method 300 may be performed by the TRU controller 82. At block 404, at least one component of the TRU 26 is powered using an energy storage device 152 composed of a first energy storage pack 152a and a second energy storage pack 152b, wherein the at least one component of the TRU 26 draws electrical power from the energy storage device 152 at an operating power. At block 406, a return air temperature of air returning to the transportation refrigeration unit 26 using a return air temperature sensor 142. At block 408, a state of charge of the first energy storage pack 152a and a state of charge of the second energy storage pack 152b is determined. At block 410, at least one of the first energy storage pack 152a and the second energy storage pack 152b is selected to power the at least one component of the TRU 26 in response to the operating power, the state of charge of the first energy storage pack 152a, and the state of charge of the second energy storage pack 152b. The energy storage pack that is not selected to provide power to the TRU 26, is the energy storage pack where the power from the generator 162 and converter 164 is sent to charge the energy storage pack.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transportation refrigeration unit comprising:
    at least one component of the transportation refrigeration unit powered by an energy storage device composed of a first energy storage pack and a second energy storage pack, wherein the at least one component of the transportation refrigeration unit draws electrical power from the energy storage device at an operating power;
    a return air temperature sensor to detect return air temperature of return air returning to the transportation refrigeration unit;
    a controller to adjust the operating power in response to the return air temperature, wherein the controller determines a state of charge of the first energy storage pack and a state of charge of the second energy storage pack,
    wherein the controller selects the first energy storage pack or the second energy storage pack to power the at least one component of the transportation refrigeration unit in response to the operating power, the state of charge of the first energy storage pack, and the state of charge of the second energy storage pack;
    wherein only one of the first energy storage pack and the second energy storage pack can power the at least one component of the transportation refrigeration unit at a single time;
    wherein the controller selects the first energy storage pack to be charged by an electrical power source when the first energy storage pack is not powering the at least one component of the transportation refrigeration unit;
    wherein the controller selects the second energy storage pack to be charged by an electrical power source when the second energy storage pack is not powering the at least one component of the transportation refrigeration unit;
    wherein the first energy storage pack includes a battery system and the second energy storage pack includes a battery system.

2. The transportation refrigeration unit of claim 1, wherein the electrical power source is at least one of an axle generator and a hub generator.

3. The transportation refrigeration unit of claim 1, wherein the energy storage device are located outside of the transportation refrigeration unit.

4. The transportation refrigeration unit of claim 1, wherein the energy storage device are located within the transportation refrigeration unit.

5. The transportation refrigeration unit of claim 1, further comprising: the energy storage device.

6. The transportation refrigeration unit of claim 1, wherein the controller is electrically connected to the energy storage device through a switching device that switches power draw from the at least one component of the transportation refrigeration unit between the first energy storage pack and the second energy storage pack.

7. A method of operating a transportation refrigeration unit, the method comprising:
    powering at least one component of the transportation refrigeration unit using an energy storage device composed of a first energy storage pack and a second energy storage pack, wherein the at least one component of the transportation refrigeration unit draws electrical power from the energy storage device at an operating power;
    detecting a return air temperature of air returning to the transportation refrigeration unit using a return air temperature sensor;
    determining a state of charge of the first energy storage pack and a state of charge of the second energy storage pack; and
    selecting the first energy storage pack or the second energy storage pack to power the at least one component of the transportation refrigeration unit in response to an operating power, a state of charge of the first energy storage pack, and a state of charge of the second energy storage pack, wherein only one of the first energy storage pack and the second energy storage pack can power the at least one component of the transportation refrigeration unit at a single time;
    selecting the first energy storage pack to be charged by an electrical power source when the first energy storage pack is not powering the at least one component of the transportation refrigeration unit;
    selecting the second energy storage pack to be charged by an electrical power source when the second energy storage pack is not powering the at least one component of the transportation refrigeration unit;
    wherein the first energy storage pack includes a battery system and the second energy storage pack includes a battery system.

8. The method of claim 7, wherein the electrical power source is at least one of an axle generator and a hub generator.

9. The method of claim 7, wherein the energy storage device are located outside of the transportation refrigeration unit.

10. The method of claim 7, wherein the energy storage device are located within the transportation refrigeration unit.

11. The method of claim 7, where the transportation refrigeration unit further comprises the energy storage device.

12. The method of claim 7, wherein the controller is electrically connected to the energy storage device through a switching device that switches power draw from the at least one component of the transportation refrigeration unit between the first energy storage pack and the second energy storage pack.

* * * * *